Oct. 18, 1966 W. RODENACKER ET AL 3,278,987
SINGLE-SHAFT SCREW EXTRUDER FOR PLASTICS
Filed March 31, 1964 4 Sheets-Sheet 1
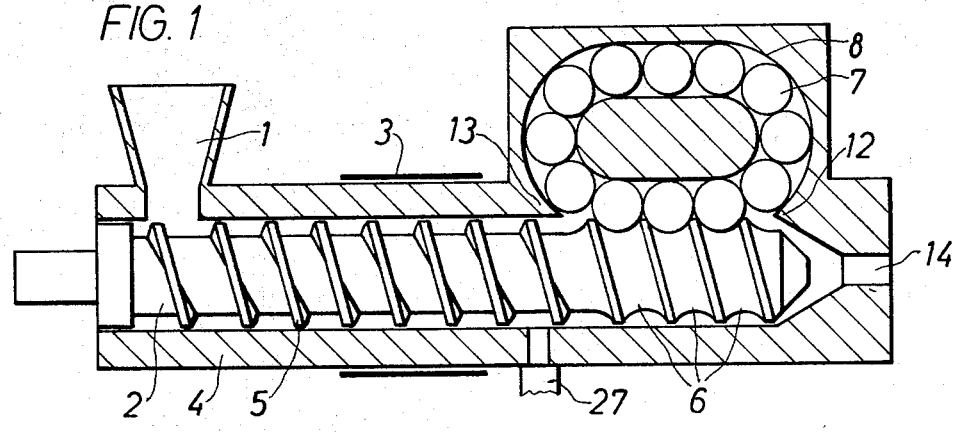
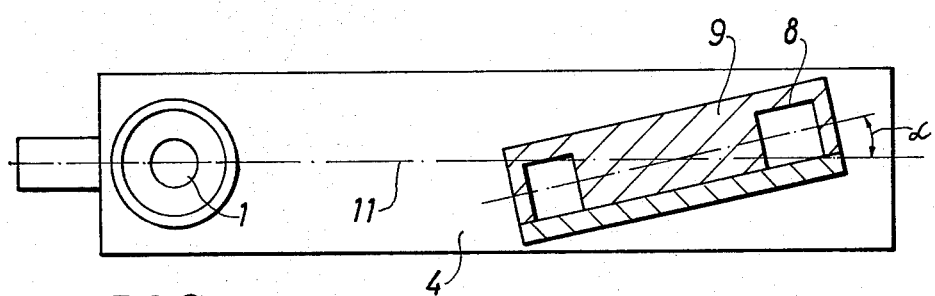
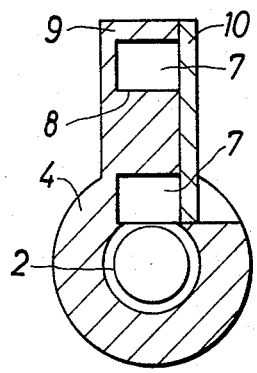
INVENTORS
WOLF RODENACKER, HEINZ WEGNER, HANS KLERX.
BY
ATTORNEYS Oct. 18, 1966   W. RODENACKER ET AL   3,278,987
SINGLE-SHAFT SCREW EXTRUDER FOR PLASTICS
Filed March 31, 1964   4 Sheets-Sheet 2

INVENTORS:
WOLF RODENACKER, HEINZ WEGNER, HANS KLERX.
BY
*Burgess, Dinklage & Sprung*
ATTORNEYS INVENTORS:
WOLF RODENACKER, HEINZ WEGNER, HANS KLERX.
BY
Burgess, Dinklage & Sprung
ATTORNEYS United States Patent Office 3,278,987
Patented Oct. 18, 1966

3,278,987
SINGLE-SHAFT SCREW EXTRUDER FOR PLASTICS
Wolf Rodenacker and Heinz Wegner, Dormagen, and Hans Klerx, Nievenheim, Germany, assignors to Farbenfabriken Bayer Aktiengesellschaft, Leverkusen, Germany, a German corporation
Filed Mar. 31, 1964, Ser. No. 356,298
Claims priority, application Germany, Apr. 1, 1963, F 39,370
8 Claims. (Cl. 18—12)

As is known in the art, the output from single-shaft screw extruders decreases as the resistance increases. The back flow in the screw threads increases with increasing resistance. However, a constant output is desired, which should be independent as far as possible from the resistance of the apparatus used.

For example, to achieve this purpose single-shaft screw extruders are employed, to which are connected gear pumps having a constant output which is independent of resistance. This combination of gear pump and extruder screw is utilizable up to a viscosity 20,000 poises, but it is very expensive considering the drive means and control apparatus required. Even more expensive are double-screw extruders or two-shaft extruders with two meshing screws which work either in parallel or in antiparallel directions. To ensure the reliable running of such a multi-shaft extruder, such large clearances have to be chosen that a certain fall in the output in relation to the resistance cannot be avoided. These machines are, however, suitable for a viscosity range of 2000 to 100,000 poises.

Oil pumps are known for use with liquids having a viscosity of 1 poise, in which the performance of a single-spindle screw is improved by means of a screw cog wheel. Furthermore, oil pumps have been described in the Swiss patent specification 332,956, in which discs are used to seal the screw threads, which rotate in a guide channel. The maximum speed of such a machine is limited to about 150–200 revs./min., and is subject to considerable loss by leaking at such speeds. These machines are quite unsuitable for conveying of viscous plastics, with regard to the feed and evacuation of the material as well as with regard to the forces acting on the discs.

It has now been found, that the drawbacks mentioned above can be overcome and the sealing of screw threads in single-shaft screw extruders can be substantially improved when the guide channel is arranged perpendicularly to the screw threads, according to the invention. In the guide channel spherical bodies are employed, for example, by means of which the highly viscous plastic melts can be sealed. An outstandingly good sealing effect can be achieved with bodies shaped like a "diabolo" or "yo-yo," which are the most suitably adapted to the form of the screw thread. A further improvement in the handling of extremely viscous plastics consists in linking the shaped bodies together in a chain in order to better distribute the forces generated. An especially simple form has been found for the manufacture and construction of the guide channel, namely, either as a milled housing provided with a cover plate, or as a channel which can be fitted into the housing from the outside and is then tightly bolted to the housing.

When compared to the double-shaft machines with a parallel or anti-parallel screw action, the invention has the advantages of substantially cheaper manufacture of the machines for equally good or better close-fitting of the screw threads. Other advantages lie in substantially easier dismantling of the screw for cleaning purposes, for example, when changing over from one color of material to another, so that the production costs are substantially reduced by extending the effective working time of the machines. The quality of the product delivered is similar to that of material delivered by a gear pump, i.e. variations in output, which could affect the dimensions of the products such as plates, foils, rods, wires, etc., are extremely small.

For some products, screws cannot be employed in combination with gear pumps, because the product penetrates into the bearings of the pump shafts where it cakes and has a strong corrosive effect. The single-shaft screw with rotating shaped bodies avoids these drawbacks, since the sealing system contains very few dead zones.

The drawings illustrate schematically embodiments of the invention.

FIG. 1 is a longitudinal sectional view of an extrusion apparatus according to a preferred embodiment of the invention.

FIG. 2 is a transverse sectional view of the extrusion apparatus of FIG. 1 taken through the guide channel thereof.

FIG. 3 is a top view, partly in section, of the extrusion apparatus shown in FIGS. 1 and 2.

Figure 4:
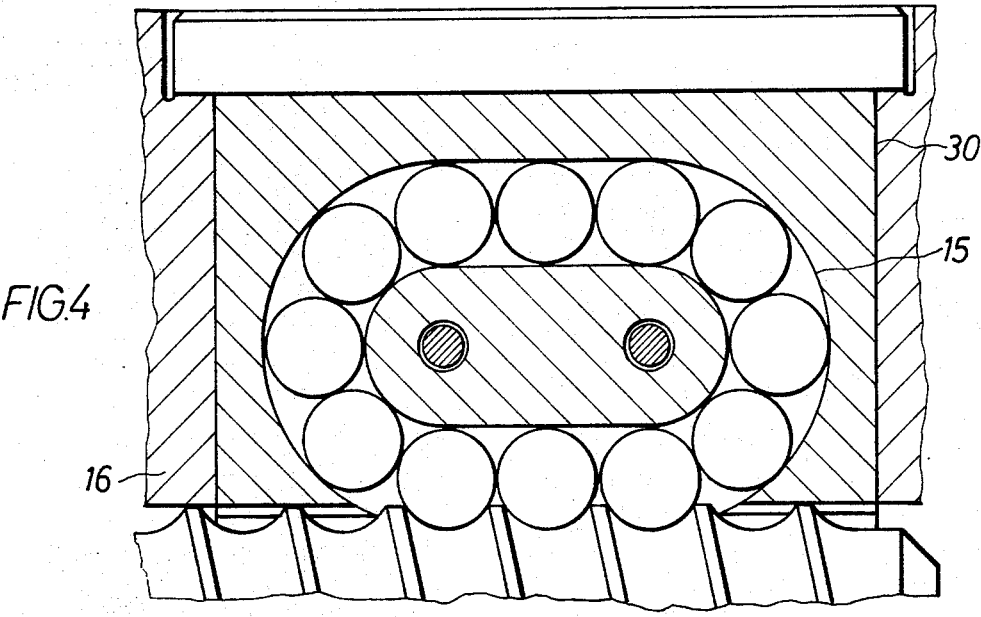
FIG. 4 is a detail view, partly in section, of the guide raceway housing portion of an extrusion apparatus according to another embodiment of the invention.

FIGS. 1, 2 and 3 show a single-shaft screw extruder for synthetic plastic materials in longitudinal and transverse section respectively. The plastic material, in the form of shavings, for example, is fed through a feed chute (not shown) into a feed hopper 1, is taken up by a screw 2 and is then melted in a housing 4 heated by means of a heating tape 3. The plastic is then pressed by screw threads 5 into zone 6, in which the threads of the screw 2 are sealed by roller-shaped bodies 7 circulating in the guide channel 8 and driven by motion of the screw. A guide channel 8 is cut laterally into an extension 9 of the housing 4 and is covered by means of a cover plate 10.

As FIG. 3 shows, the guide channel 8 is arranged in the housing 9 perpendicularly to the screw threads and at an angle α to the screw axis 11. The shaped bodies 7 fitting into the screw threads are lifted out of the screw thread at 12 and are pressed into the guide channel 8 by further shaped bodies fitting into the threads 6, owing to rotation of the screw. Since the shaped bodies 7 are in peripheral contact with each other, they are pressed back into the screw thread at 13. The length of the channel is of course chosen as a function of the required sealing effect. The housing extension 9 is provided with heating means (not shown here). The material emerges from the housing 4 through opening 14. The variations in output are similar to those obtained with a gear pump.

Figure 5:
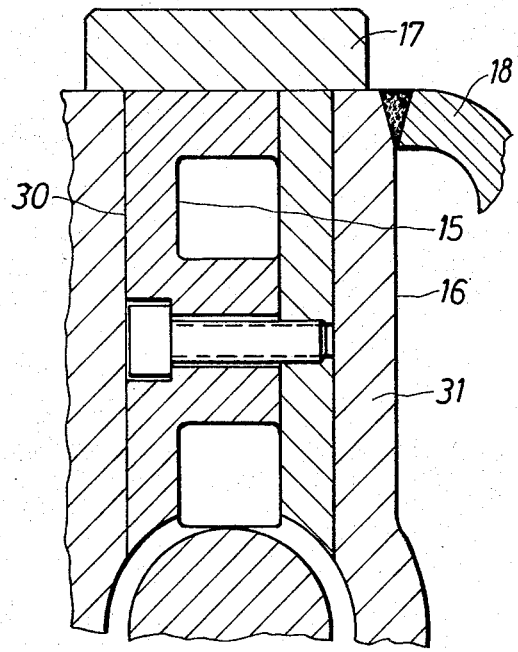
FIG. 5 is a transverse sectional view of the guide raceway housing portion shown in FIG. 4.

FIGS. 4 and 5 show another embodiment of the housing for the shaped bodies, in longitudinal and transverse section respectively. The extension of the screw housing is provided with a sector portion in reach of the screw, into which a portion 30, in which a guide channel 15 has been cut can be inserted from the outside as a push-in piece with a lid 17 into a housing 16. The cutting of the guide channel 15 does not cause any difficulties. The portion 30 with the guide channel 15 is bolted to covering wall 31 which is a portion of the lid 17. This embodiment is especially advantageous where the screw and the channel for the shaped bodies have to be provided with a jacket 18, for example, for heating with diphenyl. This jacket can be easily connected to the extension of the screw housing. This simple form of construction provides for easy interchangeability of both the guide channel and of the shaped bodies, so that the screw itself can also be easily withdrawn from the housing. This is especially important where it is desired to change over from one material or color of material to another. The extreme simplicity of cleaning the housing is a special advantage, in this case.

Figure 6:
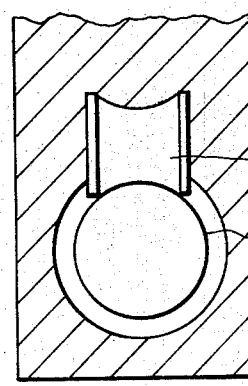
FIG. 6 is a detail view of a portion of an extrusion apparatus according to the invention, illustrating a typical wiper sealing body of diabolo shape as positioned in engagement with the worm which it seals.
Figure 7:
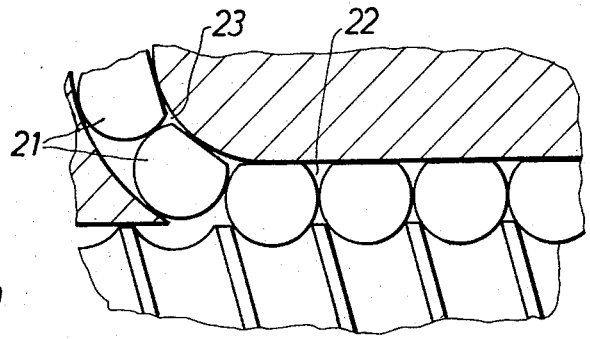
FIG. 7 is a detail view of an extrusion apparatus according to a further embodiment of the invention illustrating a train of wiper sealing bodies therein of modified construction.
Figure 8:
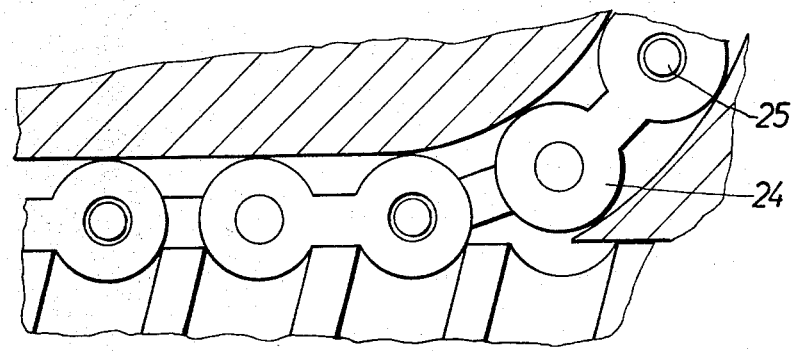
FIG. 8 is a detail view of the wiper sealing body train and worm in another extrusion apparatus according to the invention wherein the wiper sealing bodies are linked to one another to form a continuous chain.
Figure 9:
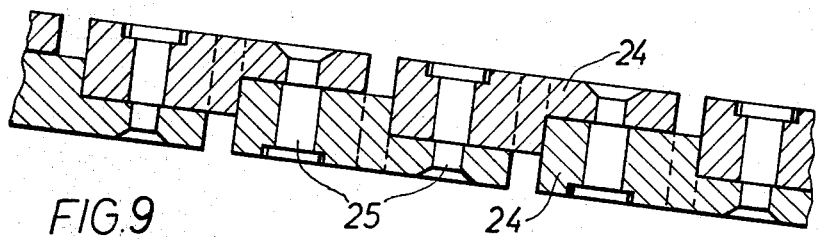
FIG. 9 is a longitudinal sectional view of the wiper sealing body train of FIG. 8.

FIG. 6 illustrates a shaped body having the form of a "diabolo" or "yo-yo," which fits especially tightly to the diameter of a screw 20. This shape, which can also be easily cut into the guide channel, provides for a high degree of closeness of fit of the screw threads, which can of course be further increased by the number of the sealed threads. Where it is required to keep the dead zones particularly small regarding the material to be processed, shaped bodies having a form 21 (FIG. 7) can be employed. In the curved portion of the guide channel, the wedge-shaped area between two consecutive shaped bodies which is relatively great at 22 will be much reduced in size at 23 owing to the particular form of the shaped bodies, and the material located between the body and the channel will be pressed onwards. Thus, no material can remain in one place permanently. At very high viscosities, the forces acting on the shaped bodies and on the guide channel become increasingly greater. In this case it is advisable to construct the shaped bodies as chain links 24, as shown in FIGS. 8 and 9, which fit into the screw threads in the same manner as the shaped bodies mentioned above. Here, the individual members of the chain are not only pushed from one side but are also pulled from the opposite direction. A better distribution of the forces acting on the shaped bodies is then achieved. The individual members of this chain have the same shape, but are alternately staggered in relation to each other and are movably connected to each other by means of bolts 25.

Figures 10, 11:
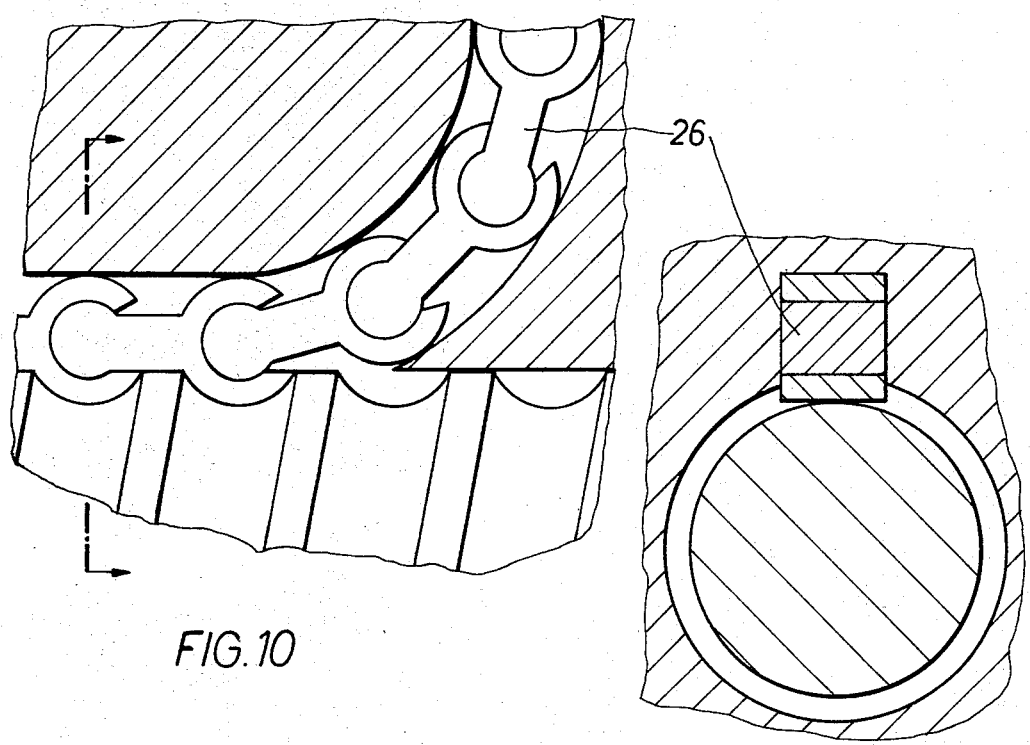
FIG. 10 is a detail view of an extrusion apparatus according to the invention having a wiper sealing body train wherein the wiper bodies are articulately connected to one another.
FIG. 11 is a detail view in section of the wiper sealing body train of FIG. 10 as taken transversely through a typical connection of two successive sealing bodies therein.

Another embodiment is shown in FIGS. 10 and 11, in which the shaped bodies have a special form 26 as rod sections. This form is particularly suitable for low-cost mass production.

Close fitting screw extruders cannot be operated without regulating in some manner the feed of the plastic cuttings to the screw. For instance, unequal amounts of cuttings will be fed to the individual screw threads which could lead to variations in the level of the solid-liquid phase boundary so that the liquid melt would pass into the unheated portion of the screw. For this reason, a hole 27 is provided in the screw housing 4, to accommodate a pressure-measuring instrument. On reaching a certain pressure, the feed chute for the cuttings (not shown) is closed, until the pressure has dropped again. Control can also be effected in another way by monitoring the torque exerted by the screw on the housing. The control of the amount of cuttings fed in is an essential feature in the operation of a screw sealed by shaped bodies.

We claim:
1. An apparatus for extruding thermoplastic materials which comprises a housing having an inlet disposed for receiving thermoplastic material and an outlet for extruding said thermoplastic material therefrom, a worm member disposed within said housing for rotation relative thereto for conveying said material from the inlet to the extrusion outlet and compressing said material for extrusion through said outlet, means defining a raceway within said housing having an open length portion disposed in tangential relation to said worm member, and a continuous train of wiper members disposed for operative engagement with said worm member in succession for recirculating movement thereby relative to said housing along a closed circuit path defined by said raceway, said wiper members being disposed to pass in succession along the open length portion of said raceway in wiping contact engagement with at least one thread of said worm member to define a fluid pressure seal thereat for blocking reverse flow of thermoplastic material conveyed under compression by said worm member.

2. The apparatus according to claim 1 wherein the open length portion of said raceway is disposed to define a corresponding wiper member movement path portion oriented substantially perpendicular to the helical pitch of the worm member.

3. The apparatus according to claim 1 wherein the wiper members are diabolo-shaped to seat transversely upon the worm member and between adjacent thread convolutions thereof.

4. The apparatus according to claim 1 wherein the wiper members each have a flattened face portion disposed for engagement with a corresponding boundary surface of said raceway for guidance thereby.

5. The apparatus according to claim 1 wherein the wiper members in the recirculating train thereof are articularly connected to one another.

6. The apparatus according to claim 1 wherein said raceway is defined by a passage open on one face and recessed into said housing, and by a plate member operatively connected to said housing and disposed to cover the open face of said recessed passage therein.

7. The apparatus according to claim 1 wherein said raceway is defined by a groove, open on one face and recessed into a plate member, and a cavity in said housing disposed to insertably receive said plate member and having a surface disposed to cover the open face of the groove therein.

8. The apparatus according to claim 1 including heating means disposed in contact with said housing for heating the thermoplastic material conveyed and compressed therein.

References Cited by the Examiner

UNITED STATES PATENTS

| | | | |
|---|---|---|---|
| 1,164,276 | 12/1915 | Fogarty | 18—12 X |
| 2,505,125 | 4/1950 | List. | |
| 2,567,147 | 9/1951 | Cousino | 18—12 X |
| 3,008,192 | 11/1961 | Allen et al. | |
| 3,160,915 | 12/1964 | Wallace et al. | 18—12 |

FOREIGN PATENTS 251,269   8/1926   Italy.

WILLIAM J. STEPHENSON, *Primary Examiner.*